US012196100B1

(12) United States Patent
Wu et al.

(10) Patent No.: US 12,196,100 B1
(45) Date of Patent: Jan. 14, 2025

(54) ENGINE COMPONENT ASSEMBLY WITH CERAMIC MATRIX COMPOSITE COMPONENT AND CONNECTION PIN

(71) Applicant: General Elecric Company, Schenectady, NY (US)

(72) Inventors: Wei Wu, Mason, OH (US); David Scott Stapleton, Boston, MA (US); Ricardo Carbajal Diaz, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/667,733

(22) Filed: May 17, 2024

(51) Int. Cl.
*F01D 11/08* (2006.01)
*F01D 25/00* (2006.01)
*F01D 25/24* (2006.01)

(52) U.S. Cl.
CPC ......... *F01D 25/246* (2013.01); *F01D 25/005* (2013.01); *F05D 2260/36* (2013.01); *F05D 2300/6033* (2013.01)

(58) Field of Classification Search
CPC ........ F01D 11/08; F01D 11/005; F01D 25/24; F01D 25/246; F05D 2240/11; F05D 2300/6033; F16B 19/02; F16B 19/00; F16B 19/002; F16B 41/002
See application file for complete search history.

(56) References Cited

U.S. PATENT DOCUMENTS

| | | | | |
|---|---|---|---|---|
| 5,205,708 | A | 4/1993 | Plemmons | |
| 9,863,265 | B2 | 1/2018 | Stapleton | |
| 10,301,960 | B2 | 5/2019 | Stapleton | |
| 10,683,770 | B2 | 6/2020 | Freeman | |
| 10,801,350 | B2 | 10/2020 | Walston | |
| 11,215,065 | B2 | 1/2022 | Starr | |
| 11,585,241 | B2 | 2/2023 | Danis | |
| 11,629,607 | B2 * | 4/2023 | Freeman | F01D 25/246 415/200 |

(Continued)

FOREIGN PATENT DOCUMENTS

| | | |
|---|---|---|
| FR | 3127024 | 3/2023 |
| FR | 3127025 | 3/2023 |

(Continued)

*Primary Examiner* — David E Sosnowski
*Assistant Examiner* — Maxime M Adjagbe
(74) *Attorney, Agent, or Firm* — Fitch, Even, Tabin & Flannery, LLP

(57) ABSTRACT

A turbine engine component assembly includes a first part comprising a ceramic matrix composite material and having a first flange defining a first borehole, a second part defining a second borehole, and a pin inserted, in an axial direction, through the first borehole and the second borehole to connect the first part to the second part. The pin includes a first contact portion positioned at a first axial location of the pin corresponding to the first borehole and an elongated portion extending axially from the first contact portion. The first contact portion includes a first chamfered section, a second chamfered section, and a first contact surface between the first chamfered section and the second chamfered section. The first chamfered section and the second chamfered section slope away from the first contact surface with decreasing diameters.

20 Claims, 7 Drawing Sheets

(56) References Cited

U.S. PATENT DOCUMENTS

| | | | | |
|---|---|---|---|---|
| 11,713,694 | B1 * | 8/2023 | Freeman | F01D 25/246 415/200 |
| 11,761,351 | B2 * | 9/2023 | Freeman | F01D 25/246 415/214.1 |
| 11,773,751 | B1 | 10/2023 | Freeman | |
| 11,781,448 | B1 | 10/2023 | Holleran | |
| 11,840,936 | B1 * | 12/2023 | Freeman | F01D 25/246 |
| 11,885,225 | B1 * | 1/2024 | Freeman | F01D 11/08 |

FOREIGN PATENT DOCUMENTS

| | | |
|---|---|---|
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

ENGINE COMPONENT ASSEMBLY WITH CERAMIC MATRIX COMPOSITE COMPONENT AND CONNECTION PIN

FIELD OF THE DISCLOSURE

The present subject matter relates generally to component assemblies of gas turbine engines, and more specifically regarding a ceramic matrix composite component assembly.

BACKGROUND

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable turbine components and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap may be defined between the shroud of a shroud assembly and the rotatable turbine components of an associated stage of rotatable turbine components. The shroud is typically retained within the gas turbine engine by a shroud hanger, which in turn is coupled to various other components of the engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
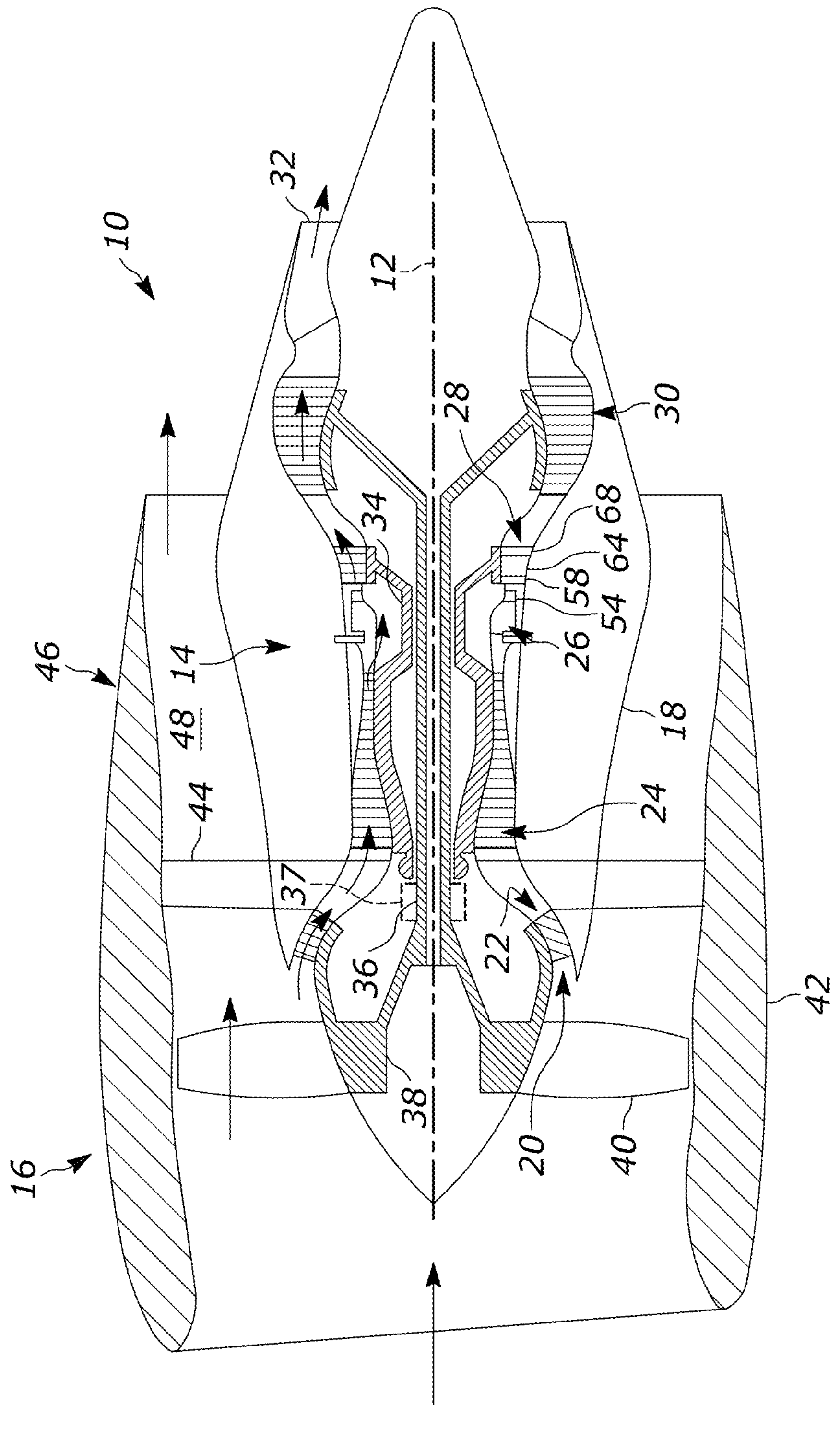
FIG. 1 is a schematic cross-sectional view of a gas turbine engine in accordance with some embodiments of the present disclosure.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Due to extreme operating temperatures and pressures within the gas turbine engine, it is desirable to utilize materials with high temperature and pressure resistance and a low coefficient of thermal expansion for the airfoils and/or the inner and outer bands. For example, to operate effectively in such strenuous temperature and pressure conditions, composite materials have been suggested for use, and, in particular, ceramic matrix composite (CMC) materials. Due to the relatively low coefficient of thermal expansion and high temperature and pressure resistance of CMC materials as compared to metallic parts, CMC materials can allow for higher operating temperatures within the engine, resulting in higher engine efficiency.

As used herein, CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3\ \lambda SiO_2$), as well as glassy aluminosilicates.

In certain embodiments, the reinforcing fibers may be bundled and/or coated prior to inclusion within the matrix. For example, bundles of the fibers may be formed as a reinforced tape, such as an unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. Such materials, along with certain monolithic ceramics (i.e., ceramic materials without a reinforcing material), are particularly suitable for higher temperature applications.

Engine components, such as shrouds and airfoils, can be formed of CMC. However, CMC materials have relatively low tensile ductility or low strain to failure when compared to metallic materials. Also, CMC materials have a coefficient of thermal expansion (CTE) which differs significantly from metal alloys used as restraining supports or hangers for shrouds or airfoils of CMC type materials.

A CMC engine component can be connected to a metal hanger on the engine via pins and holes as the assembly method. However, edge chipping and wear degradation of the CMC material can be an issue. In addition, due to coefficient of thermal expansion mismatch between CMC and metal, it is difficult to maintain perfect clearance during cold assembly and requires a precise locating feature for the CMC component to be held in the engine. Designing a pin to fit the metal hanger with a controlled interference fit can increase the ease of assembly. Additionally, designing a pin to interface with CMC components, have the ability to avoid edge chipping, and have a precisely controlled interface, can provide improved pin load and part durability.

In some embodiments, an engine assembly with a pin coupling a CMC engine component is described herein. Particularly, a stepped pin with chamfered edges is provided to decrease edge chipping of the CMC component. The stepped design also allows for a controlled interference fit between the pin and the engine parts, providing the ability to improve disassembly efforts and to increase part durability.

Referring now to the drawings, wherein identical numerals indicate the same elements throughout the figures.

FIG. 1 is a schematic cross-sectional view of an exemplary high-bypass turbofan type engine 10 herein referred to as "engine 10". Particularly, FIG. 1 is provided as an example of types of engines that may incorporate various embodiments of the present disclosure. As shown in FIG. 1, the engine 10 has a longitudinal or axial centerline 12 that extends therethrough for reference purposes. In general, the engine 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or a low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also be connected to a fan shaft or spool 38 of the fan section 16. In particular embodiments, the LP spool 36 may be connected directly to the fan spool 38 such as in a direct-drive configuration. In alternative configurations, the LP spool 36 may be connected to the fan spool 38 via a speed reduction device 37 such as a reduction gear gearbox in an indirect-drive or geared-drive configuration. Such speed reduction devices may be included between any suitable shafts/spools within the engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 to define a bypass airflow passage 48 therebetween.

Figure 2:
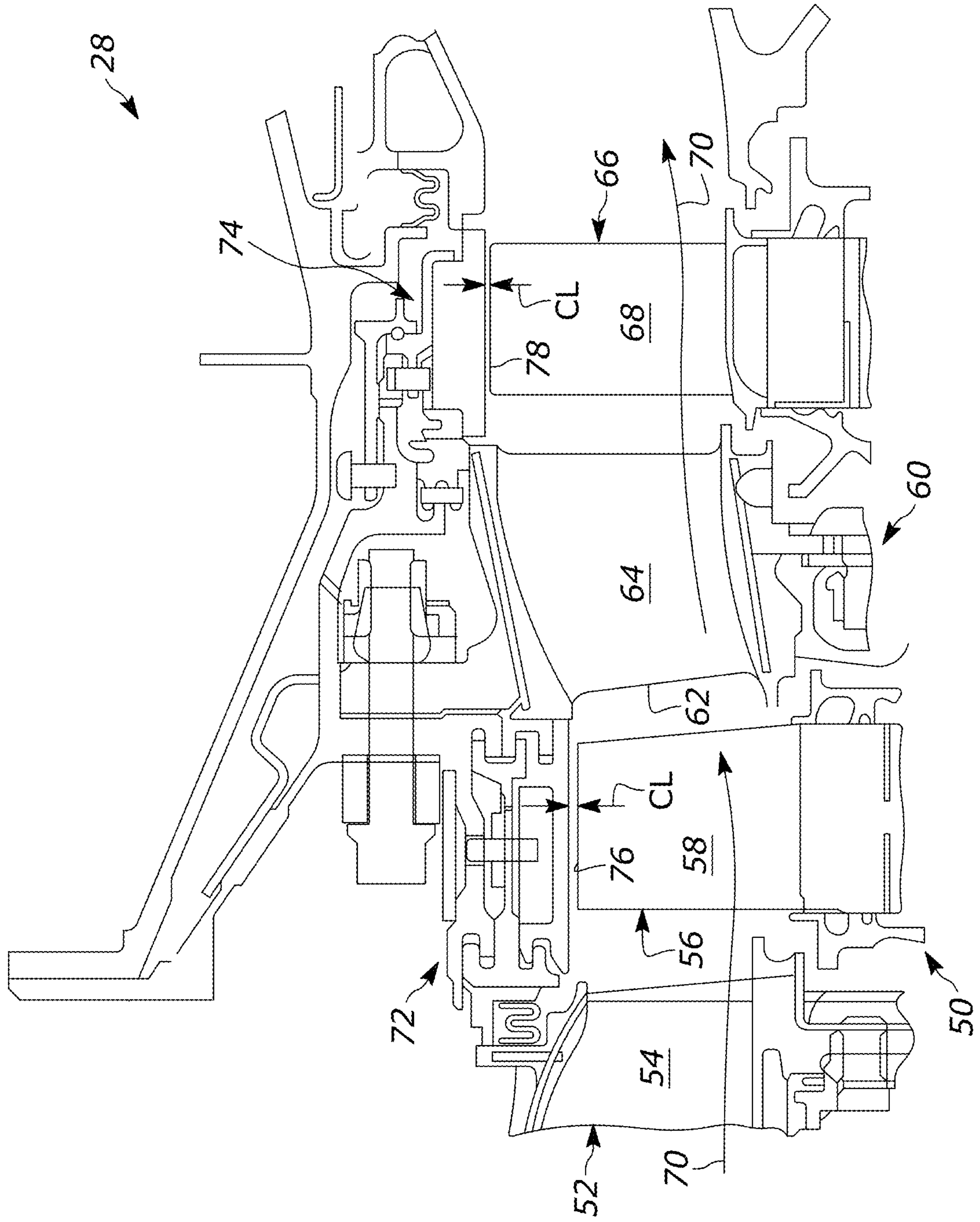
FIG. 2 is an enlarged cross-sectional side view of a high-pressure turbine section of a gas turbine engine in accordance with some embodiments of the present disclosure.

FIG. 2 provides an enlarged cross sectioned view of the HP turbine 28 portion of the gas turbine engine 14 as shown in FIG. 1. In FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of turbine rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the turbine rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the LP compressor 22, HP compressor 24, and/or LP turbine 30. Accordingly, shrouds and shrouds assemblies as disclosed herein are not limited to use in HP turbines 28, and rather may be utilized in any suitable section of a gas turbine engine.

Figure 3:
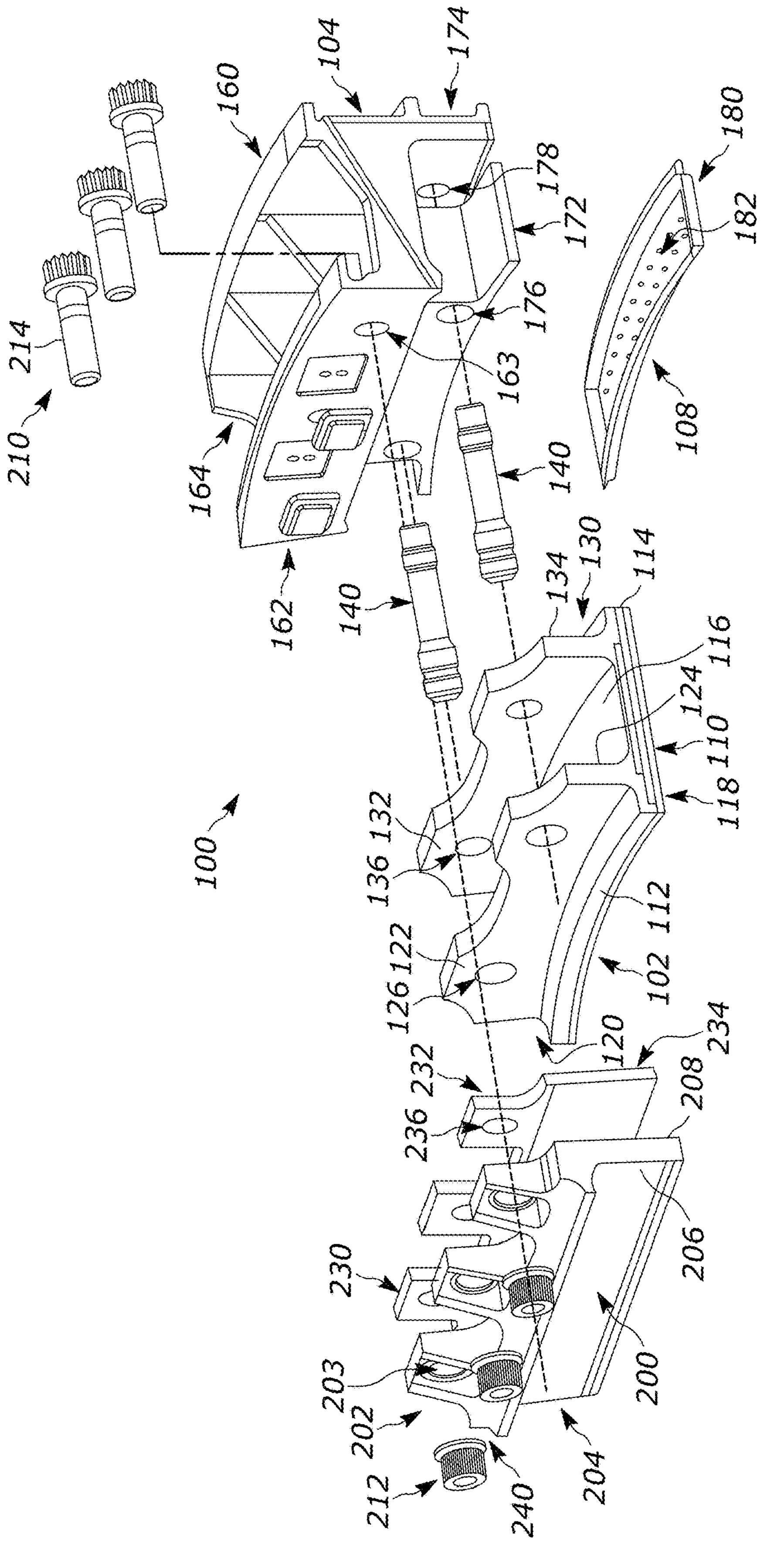
FIG. 3 is an exploded perspective view of a shroud assembly in accordance with some embodiments of the present disclosure.
Figure 4:
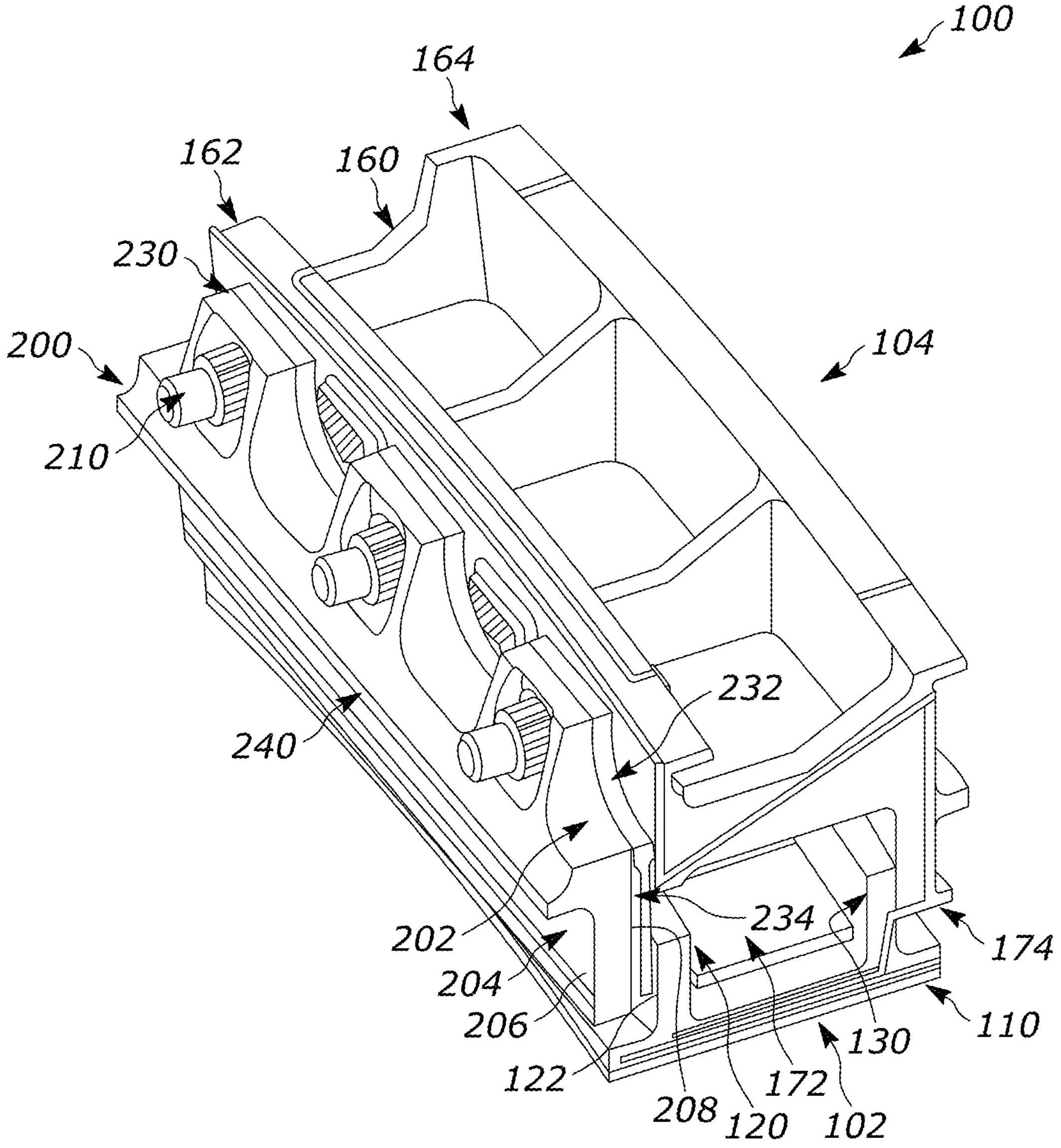
FIG. 4 is an assembled perspective view of a shroud assembly in accordance with some embodiments of the present disclosure.

Referring now to FIGS. 3 and 4, improved shroud assemblies 100 are disclosed. The shroud assemblies 100 as disclosed herein may be utilized in place of shroud assemblies 72, 74, as discussed above, or any other suitable shroud assemblies in the engine 10.

Shroud assemblies in accordance with the present disclosure provide a number of advantages. In particular, the shroud assemblies 100 include features which advantageously facilitate load transmission from axially forward nozzles through the hangers of the shroud assemblies 100 to the casing of the engine 10, while reducing or eliminating load transmission through the shrouds of such shroud assemblies. This is particularly desirable in embodiments wherein the shrouds are formed from ceramic matrix composite ("CMC") materials. Further, the use of shroud assemblies in accordance with the present disclosure reduces undesirable issues associated with previously known load transmission components, such as large nozzle-shroud axial gap variations and resulting increases in purge flow, as well as associated weight and cost issues. Accordingly, the gas turbine engine efficiency is increased, weight is reduced, and cost is reduced.

FIGS. 3 and 4 illustrate embodiments of the shroud assembly 100 in accordance with the present disclosure. The shroud assembly 100 includes a shroud 102 and a hanger 104. The shroud 102 in accordance with the present disclosure may include, for example, a shroud body 110, a forward flange 120, and a rear flange 130. In exemplary embodiments, the shroud body 110, the forward flange 120, and the rear flange 130 (and the shroud 102 in general) may be formed from a CMC material, although in alternative embodiments the shroud body 110, the forward flange 120, and the rear flange 130 (and the shroud 102 in general) may be formed from another suitable material such as a metal, etc. In particular, in exemplary embodiments, the shroud body 110, the forward flange 120, and the rear flange 130 may be integral and thus generally formed as a single component.

The shroud body 110 may include a forward surface 112 and a rear surface 114. The rear surface 114 is axially spaced from the forward surface 112, such as generally along the centerline 12 when in the engine 10 (FIG. 1). An inner surface 116 and an outer surface 118 may each extend between the forward surface 112 and the rear surface 114. The outer surface 118 is radially spaced from the inner surface 116. The inner surface 116 may, when the shroud 102 is in the engine 10 (FIG. 1), be exposed to the hot gas path 70 (FIG. 2), while the outer surface 118 is thus radially spaced from the hot gas path 70 (FIG. 2).

The forward flange 120 and the rear flange 130 may each extend from the shroud body 110, such as from the outer surface 118 thereof. The rear flange 130 may be axially spaced from the forward flange 120. Further, the forward flange 120 may be generally positioned proximate the forward surface 112 of the shroud body 110, while the rear flange 130 is generally positioned proximate the rear surface 114 of the shroud body 110. Each forward flange 120 and rear flange 130 may include a forward surface 122, 132 (respectively) and a rear surface 124, 134 respectively. As shown, the forward flange 120 and the rear flange 130 may each extend generally circumferentially along their lengths, and thus be circumferentially oriented.

Further, one or more bore holes 126, 136 may be defined in each forward flange 120 and rear flange 130, respectively. Each bore hole 126, 136 may, for example, extend generally axially through the associated forward flange 120 and rear flange 130 between the associated forward surface 122, 132 and the associated rear surface 124, 134. The bore holes 126, 136 are generally utilized for connecting the shroud 102 to the hanger 104. For example, pins 140 may be inserted into the bore holes 126, 136 and associated bore holes of the hanger 104 to connect the shroud 102 to the hanger 104. The pin 140 may include one or more chamfered edges to reduce chipping and other damages to the shroud. Further details of the pin 140 according to some embodiments are described in more detail with reference to FIGS. 5-7C herein.

The hanger 104 generally is connected to and supports the shroud 102 in the engine 10 (FIG. 1), and is itself supported by various other components in the engine 10 (FIG. 1). The hanger 104 may include a hanger body 160, and a forward hanger arm 162 and a rear hanger arm 164 extending from the hanger body 160, such as radially outward (away from the hot gas path 70 (FIG. 2)) from the hanger body 160. The hanger body 160 may thus extend between the forward hanger arm 162 and the rear hanger arm 164. The rear hanger arm 164 may be axially spaced from the forward hanger arm 162, as shown.

The hanger 104 may further include one or more flanges extending from the hanger body 160, such as radially inward (towards the hot gas path 70 (FIG. 2)) from the hanger body 160. For example, a forward flange 172 and a rear flange 174 may extend from the hanger body 160. The rear flange 174 may be axially spaced from the forward flange 172. The forward flange 172 may be proximate the forward hanger arm 162 and the rear flange 174 may be proximate the rear hanger arm 164. One or more bore holes 176, 178 may be defined in the forward flange 172 and the rear flange 174 respectively.

When assembled, the bore holes 126, 136 of the forward flange 120 and the rear flange 130 respectively, may generally align with the associated hanger bore holes 176, 178. For example, the bore holes 126 may align with the bore holes 176, and the bore holes 136 may align with the bore holes 178. One or more pins 140 may be inserted through and thus extend through the associated bore holes 126, 176, 136, and 178 to couple the hanger 104 and the shroud 102 together. In some embodiments as shown, the pin 140 may extend through aligned bore holes 126, 176, 136 and 178. Alternatively, separate pins 140 may be utilized for aligned bore holes 126, 176 and aligned bore holes 136, 178. Accordingly, the forward flange 120 and the rear flange 130 may be coupled to the forward flange 172 and the rear flange 174.

In exemplary embodiments, the hanger body 160, the forward hanger arm 162, the rear hanger arm 164, the forward flange 172 and the rear flange 174 (and the hanger 104 in general) may be formed from a metal material, although in alternative embodiments the hanger body 160, the forward hanger arm 162, the rear hanger arm 164, the forward flange 172 and the rear flange 174 (and the hanger 104 in general) may be formed from another suitable material.

As shown, the shroud assembly 100 may further include a baffle 108. The baffle 108 may be disposed radially between the hanger 104 and the shroud 102 of the shroud assembly 100. The baffle 108 may include a body 180 which defines a plurality of cooling holes 182 for routing fluid therethrough, such as for cooling purposes. In exemplary embodiments, the baffle is formed from a metal material, although in alternative embodiments the baffle 108 may be formed from another suitable material.

Referring still to FIGS. 3 and 4, the shroud assembly 100 may further include a support member 200 which is positioned axially forward of the forward hanger arm 162.

Referring still to FIGS. 3 and 4, the support member 200 in exemplary embodiments is formed from a metal material, although in alternative embodiments the support member 200 may be formed from any suitable material. The support member 200 may include a radially outer portion 202 and a radially inner portion 204, and may further have a forward surface 206 and an aft surface 208.

The radially outer portion 202 of the support member 200 may be connected to the forward hanger arm 162. In exemplary embodiments, one or more mechanical fasteners 210 may connect the radially outer portion 202 and the forward hanger arm 162. For example, one or more bore holes 163 may be defined in the forward hanger arm 162, and one or more mating bore holes 203 may be defined in outer portion 202. The mechanical fastener 210 may extend through each aligned bore hole 163 and mating bore hole 203 to connect the radially outer portion 202 and the forward hanger arm 162. In exemplary embodiments as illustrated, the mechanical fasteners 210 may each include a nut 212 and a mating bolt 214, as illustrated. Alternatively, other suitable mechanical fasteners, such as screws, nails, rivets, etc., may be utilized.

In exemplary embodiments, the mechanical fasteners 210 are formed from a metal material, although in alternative embodiments the mechanical fasteners 210 may be formed from another suitable material.

In other embodiments, as illustrated in FIGS. 3 and 4, a hanger plate 230 may be disposed between the support member 200 and the forward hanger arm 162. The hanger plate 230 may be in contact with the radially outer portion 202 and the forward hanger arm 162, as illustrated.

The hanger plate 230 may generally further protect the shroud 102 from contact with the support member 200, such as with the radially inner portion 204 thereof. As shown, the hanger plate 230 may be connected to and between the radially outer portion 202 and the forward hanger arm 162. For example, the hanger plate 230 may include a radially outer portion 232 and a radially inner portion 234. The radially outer portion 232 may be connected between the radially outer portion 202 of the support member 200 and the forward hanger arm 162. For example, one or more bore holes 236 may be defined in the radially outer portion 232. The bore hole 236 may, when assembled, align with neighboring bore holes 163, 203, and the mechanical fastener 210 may extend through the bore hole 236 as well as the bore holes 163, 203 to connect the radially outer portion 232 to and between the radially outer portion 202 and the forward hanger arm 162.

Referring still to FIGS. 3 and 4, in some embodiments, the support member 200 may additionally include a protrusion 240 which extends axially from the forward surface 206, such as between the radially outer portion 202 and the radially inner portion 204. This interaction may further facilitate load transmission through the support member 200 to the hanger 104, while load transmission to the shroud 102 is advantageously reduced or eliminated.

While the pin 140 is shown to be coupling the shroud 102 to the hanger 104 in FIGS. 2-4, the various embodiments of the pin 140 described herein may be used to connect other engine components, particularly for coupling a CMC component to a metal or metal alloy component. For example, the pin 140 may connect the fan blades 40, the stator vanes 64, or other airfoils in the engine 10 to a hanger of the casing 18 (FIGS. 1 and 2).

Figure 5:
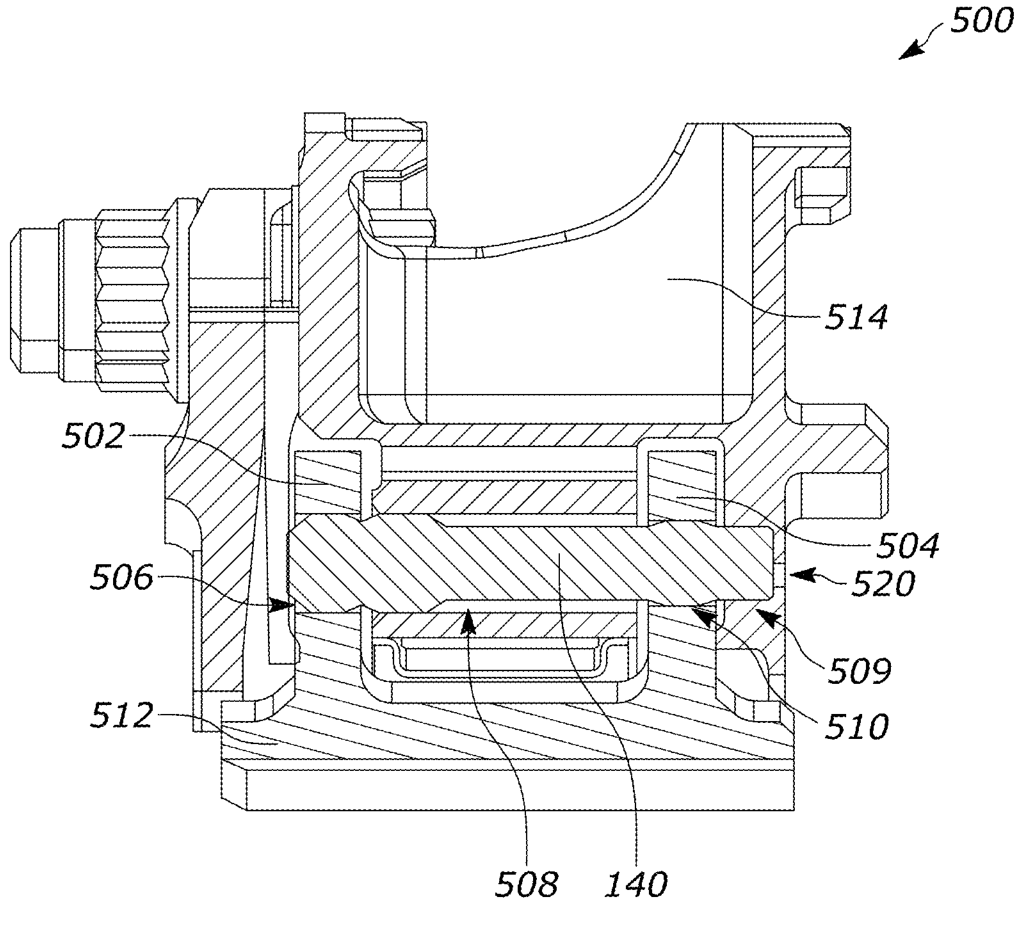
FIG. 5 includes an illustration of a cross-sectional view of a shroud assembly in accordance with some embodiments of the present disclosure.

Referring now to FIG. 5, the pin 140 is shown inserted within a turbine engine component assembly 500. The turbine engine component assembly 500 includes a first part 512 which has a first flange 502 and a second flange 504. The first flange 502 has a first borehole 506, and the second flange 504 has a third borehole 510. The turbine engine component assembly 500 also includes a second part 514 which includes a second borehole 508 and a fourth borehole 509. The pin 140, inserted in an axial direction, connects the first part 512 and the second part 514 via the first borehole 506, the second borehole 508, the third borehole 510 and the fourth borehole 509. In some embodiments, the second part 514 further includes a de-tool hole 520 for removing the pin 140 to disassemble the first part 512 and the second part 514. In some embodiments, the pin 140 may be formed of a metal or metal alloy, such as the same metal or metal alloy that forms the second part 514.

In some embodiments, the first part 512 may be a shroud or flowpath airfoil, and the second part 514 may be a hanger on a turbine casing of a turbine engine assembly. In some embodiments, the first part 512 may be the shroud 102 described in FIGS. 1-3 and the second part 514 may be the hanger 104. The first flange 502, the second flange 504, the first borehole 506, the second borehole 508, the third borehole 510, and the fourth borehole 509 may be the forward flange 120, the rear flange 130, and the bore holes 126, 176, 136, and 178 as described in FIGS. 3-4 respectively. In some embodiments, the first part 512 may instead be an airfoil of the engine 10 such as a fan blade 40 or a stator vane 64 (FIGS. 1 and 2), and the second part 514 may be a hanger for coupling the airfoil to the casing 18 (FIG. 1). In some embodiments, the first part 512 may be a CMC engine component while the second part 514 may be a metal or metal alloy engine component.

Figure 6:
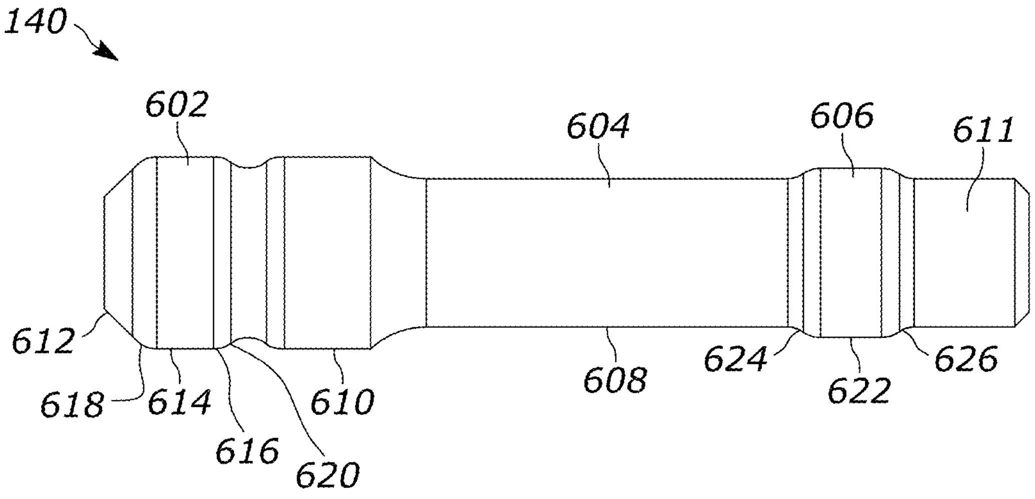
FIG. 6 includes an illustration of a pin in accordance with some embodiment of the present disclosure.

FIG. 6 illustrates the pin 140 in further detail. The pin 140 includes a first contact portion 602, a second contact portion 606, and an elongated portion 604. The first contact portion 602 is positioned at a first axial location of the pin 140 corresponding to the first borehole 506. In some embodiments, the axial length of the first contact portion 602 is between 5-15% of the length of the pin 140, and/or between 40-90% of the axial length of the first borehole 506 in the first flange 502.

The first contact portion 602 further includes a first chamfered section 612, a second chamfered section 616, and a first contact surface 614 between the first chamfered section 612 and the second chamfered section 616. The first chamfered section 612 and the second chamfered section 616 each slopes away from the first contact surface 614 with decreasing diameters.

In some embodiments, the diameter of the first contact surface 614 of the first contact portion 602 may be 2-3% less than the diameter of the first borehole 506 (FIG. 5). In some embodiments, the slopes of the first chamfered section 612 and the second chamfered section 616 are each between 25-65 degrees. In some embodiments, the axial length of the first chamfered section 612 and the second chamfered section 616 are each 10-40% of the axial length of the first contact surface 614.

The first contact portion 602 may further include a first blend section 618 deposed between the first contact surface 614 and the first chamfered section 612. The first blend section 618 may include a fillet or rounded edge that transitions from the first contact surface 614 to the first chamfered section 612. The first contact portion 602 may further include a second blend section 620 deposed between the first contact surface 614 and the second chamfered section 616. The second blend section 620 may further include a fillet or rounded edge that transitions from the first contact surface 614 to the second chamfered section 616. In some embodiments, the first blend section 618 and the second blend section 620 are each between 2-10% of the axial length of the first contact portion 602.

In FIG. 6, the pin 140 further includes the second contact portion 606 at a second axial location corresponding to the second borehole 508. The second contact portion 606 may further include a second contact surface 622, a third chamfered section 624, and a fourth chamfered section 626. The second contact surface 622 is in contact with the second flange 504 of the first part 512 via the third borehole 510. In some embodiments, the second contact surface 622 may have a lesser or greater diameter compared to the first contact portion 602. In some embodiments, the second contact surface 622, the third chamfered section 624, and the fourth chamfered section 626 may be the same or similar to the first contact surface 614, the first chamfered section 612, and the second chamfered section 616 described herein. While two contact portions are shown, namely, the first contact portion 602 and the second contact portion 606, in some embodiments, the pin 140 may include only one, or three or more contact portions according to the number of flanges and boreholes on the components being connected. Each contact portion may similarly include chamfered sections and blend sections as described herein.

The elongated portion 604 of the pin 140 includes a body section 608 and an interface section 610. The body section 608 being smaller in diameter compared to the interface section 610 and the first contact surface 614 of the first contact portion 602. That is, when the pin 140 is inserted through the second borehole 508, only the interface section 610 of the elongated portion 604 contacts the second borehole 508 of the second part 514 (FIG. 5). In some embodiments, the diameter of the interface section 610 is between 10-30% greater than the diameter of the body section 608. In some embodiments, the diameter of the first contact surface 614 of the first contact portion 602 is also between 10-30% greater than the diameter of the body section 608. In some embodiments, the axial length of the interface section 610 is between 5-15% of the axial length of the body section 608. While the interface section 610 is shown as being located near the first contact portion 602 of the pin 140 in FIG. 6, the interface sections 610 may be positioned at various axial locations along the elongated portion 604 such as near the center or near the second contact portion 606.

In some embodiments, the interface section 610 is a press fit interface which contacts at least a portion of the second borehole 508 (FIG. 5), and the diameter of the interface section 610 is between 2.54 and 12.7 micrometers bigger than the diameter of the portion of the second borehole 508 contacted. In some embodiments, the interface section 610 may include a first threaded interface for coupling with a second threaded interface of the second borehole 508 (FIG. 5). In some embodiments, the interface section 610 may be welded to a portion of the second borehole 508 (FIG. 5). In some embodiments, the interface section 610 is chamfered at both ends. In some embodiments, the edges of the interface section 610 may have the same or similar chamfers as the first chamfered section 612 and the second chamfered section 616 of the first contact portion 602. In some embodiments, the pin 140 includes a second interface section 611 at a location corresponding to the fourth borehole 509 of the second part 514 (FIG. 5). In FIG. 6, the second interface section 611 is at an end of the pin 140 and adjacent to the second contact portion 606. The interface between the second interface section 611 and the fourth borehole 509 may be the same or similar to the interface between the interface section 610 and the second borehole 508 (FIG. 5) described herein. While two interface sections are shown in FIG. 6, namely, the interface section 610 and the second interface section 611, in some embodiments, the pin 140 may include one, two, three or more interface sections, examples of which are described with reference FIGS. 7A-7C herein.

Figure 7A:
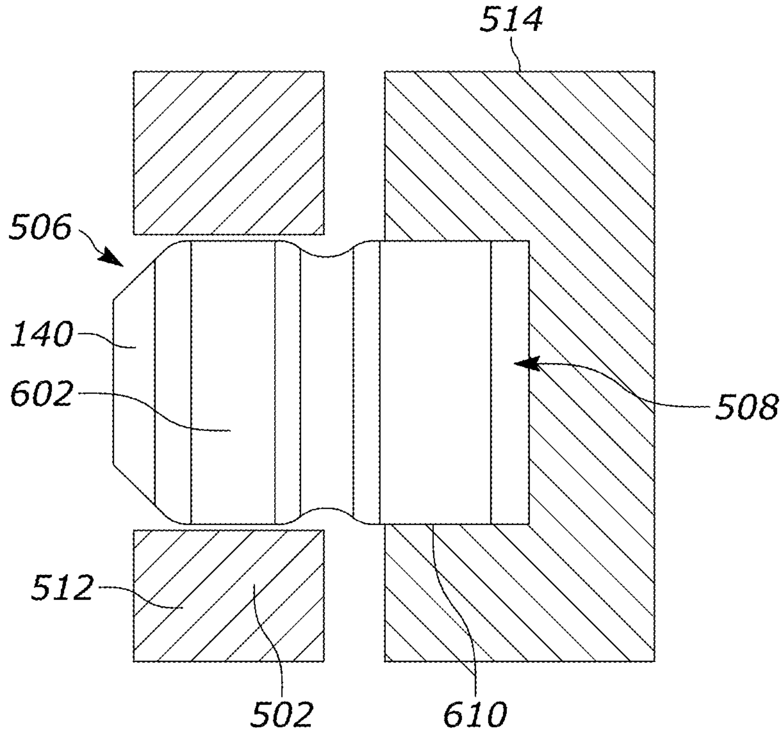
FIGS. 7A-C include illustrations of a pin coupled to engine components in accordance with some embodiments of the present disclosure.

In FIG. 7A, an embodiment of the turbine engine component assembly 500 with the pin 140 having a single first contact portion 602 and a single interface section 610 is shown. In FIG. 7A, the first part 512 includes a single first flange 502 with the first borehole 506, and the second part 514 includes the second borehole 508. The hanger 104 connects the first part 512 and the second part 514 via the first contact portion 602 in the first borehole 506 and the interface section 610 in the second borehole 508.

Figure 7B:
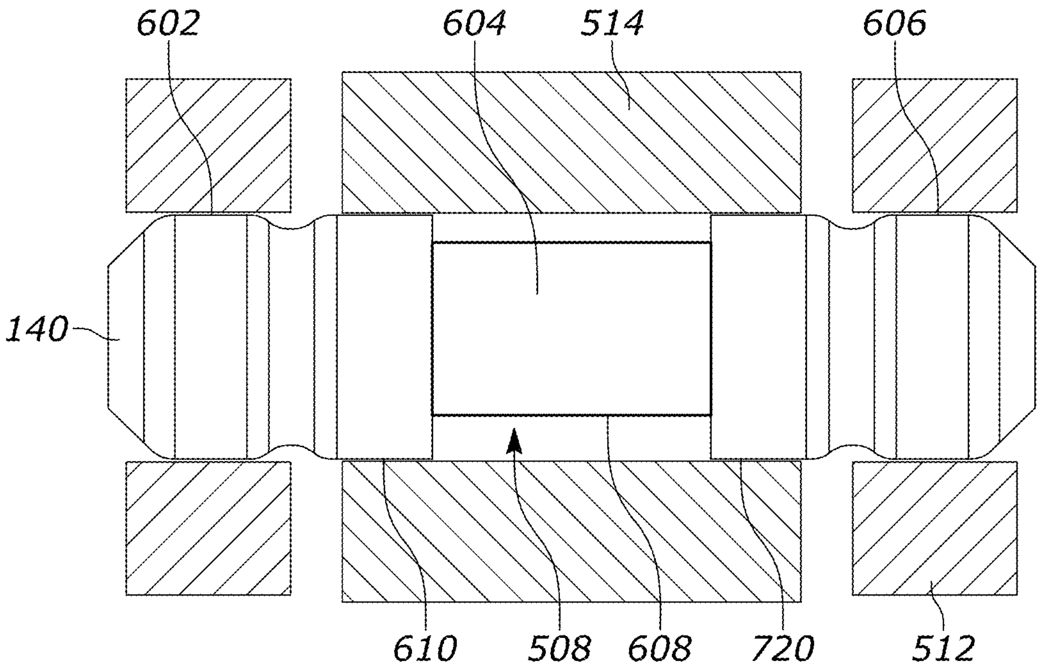

In FIG. 7B, another embodiment of the turbine engine component assembly 500 is shown. In FIG. 7B, the pin 140 is similar to the pin 140 shown in FIG. 6 except for the elongated portion 604 having the interface section 610 and an interface section 720 spaced apart from the interface section 610 with a narrower body section 608 between the interface sections 610 and 720. In this embodiment, the pin 140 contacts the first part 512 via the first contact portion 602 and the second contact portion 606 and contacts the second part 514 at two locations within the second borehole 508 corresponding to the locations of the interface sections 610 and 720. While the interface sections 610 and 720 are shown at two ends of the elongated portion 604 of the pin 140 in FIG. 7B, the interface sections 610 and 720 may be positioned at various axial locations along the elongated portion 604.

Figure 7C:
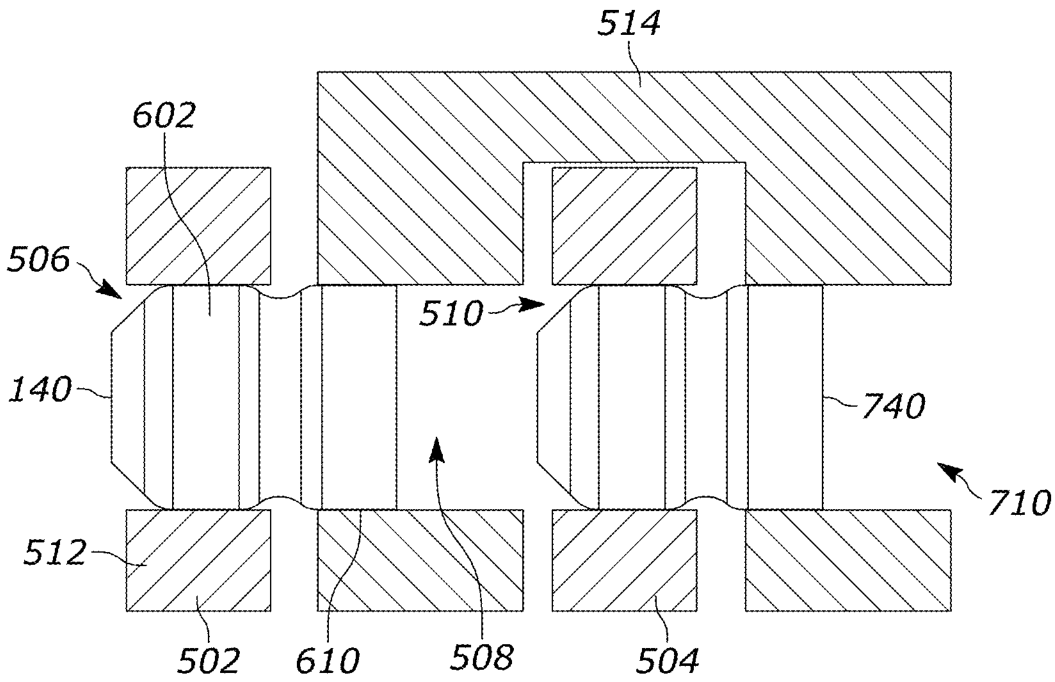

In FIG. 7C, yet another embodiment of the turbine engine component assembly 500 is shown. The turbine engine component assembly 500 in FIG. 7C includes the pin 140 and a second pin 740, which may be the same or similar to the pin 140, for connecting the first part 512 with the second part 514. The first part 512 includes the first flange 502 defining the first borehole 506 and the second flange 504 defining the third borehole 510. The second part 514 defines a second borehole between the first flange 502 and the second flange 504, and a fourth borehole 710 on the side of the second flange 504 opposite the second borehole 508. The pin 140 is inserted in the first borehole 506 and the second borehole 508, while the second pin 740 is inserted in the third borehole 510 and the fourth borehole 710 to connect the first part 512 to the second part 514. The pin 140 has the first contact portion 602 positioned within the first borehole 506 and the interface section 610 positioned within the second borehole 508. The second pin 740 has a contact portion positioned within the third borehole 510 and an interface section positioned within the fourth borehole 710. The contact portion and the interface section of the second pin 740 may generally be the same or similar to the first contact portion 602 and the interface section 610 described.

Generally, the pin 140 may include at least one first contact portion 602 and at least one elongated portion 604 having at least one interface section 610 arranged along the pin 140 according to the configuration of the flanges and boreholes on the engine components being connected. Other possible configurations may include, but are not limited to, the pin 140 having a contact portion between two interface sections, having three or more contact portions, having three of more interface sections, having a plurality of alternating contact portions and interface sections, etc.

With the turbine engine component assembly 500 described herein, and particularly having the pin 140 with the first contact portion 602 with chambered edges for contacting CMC components, edge chipping of the CMC material may be reduced while maintaining a controlled interference fit with the metal or metal alloy components.

Further aspects of the disclosure are provided by the subject matter of the following clauses:

A turbine engine component assembly includes a first part including a ceramic matrix composite material and having a first flange defining a first borehole; a second part defining a second borehole; and a pin inserted, in an axial direction, through the first borehole and the second borehole to connect the first part to the second part, the pin including: a first contact portion positioned at a first axial location of the pin corresponding to the first borehole and, an elongated portion extending axially from the first contact portion; wherein the first contact portion includes a first chamfered section, a second chamfered section, and a first contact surface between the first chamfered section and the second chamfered section, wherein the first chamfered section and the second chamfered section slope away from the first contact surface with decreasing diameters.

The turbine engine component assembly of any preceding clause, wherein the first part includes a shroud or a flowpath airfoil and the second part includes a hanger on a turbine casing of the turbine engine component assembly.

The turbine engine component assembly of any preceding clause, wherein the second part is formed of a metal or metal alloy.

The turbine engine component assembly of any preceding clause, wherein the pin is formed of a metal or a metal alloy.

The turbine engine component assembly of any preceding clause, wherein slopes of the first chamfered section and the second chamfered section are each between 25-65 degrees.

The turbine engine component assembly of any preceding clause, wherein the axial length of the first chamfered section and the second chamfered section are each 10-40% of the axial length of the first contact surface.

The turbine engine component assembly of any preceding clause, wherein a first blend section is deposed between the first contact surface and the first chamfered section, the first blend section including a rounded edge that transitions from the first contact surface to the first chamfered section; and wherein a second blend section is deposed between the first contact surface and the second chamfered section, the second blend section including a rounded edge that transitions from the first contact surface to the second chamfered section.

The turbine engine component assembly of any preceding clause, wherein the axial length of the first blend section and the second blend section are each between 2-10% of the axial length of the first contact portion.

The turbine engine component assembly of any preceding clause, wherein the diameter of the first contact surface of the first contact portion is 2-3% less than the diameter of the first borehole.

The turbine engine component assembly of any preceding clause, wherein the axial length of the first contact portion is between 5-15% of the length of the pin.

The turbine engine component assembly of any preceding clause, wherein the axial length of the first contact surface is between 40-90% of the axial length of the first borehole in the first flange.

The turbine engine component assembly of any preceding clause, wherein the first part further includes: a second flange defining a third borehole; and wherein the pin further includes a second contact portion at a second axial location corresponding to the second borehole, the second contact portion including a second contact surface, a third chamfered section, and a fourth chamfered section.

The turbine engine component assembly of any preceding clause, further including: a second pin having a second contact portion including a second contact surface, a third chamfered section, and a fourth chamfered section; wherein the first part includes a second flange defining a third borehole and the second part defines a fourth borehole; and wherein the second pin is inserted in the third borehole and the fourth borehole to connect the first part and the second part, and the second contact surface is positioned within the third borehole.

The turbine engine component assembly of any preceding clause, wherein the elongated portion includes a body section and an interface section, the body section being smaller in diameter compared to the interface section and the first contact surface of the first contact portion.

The turbine engine component assembly of any preceding clause, wherein the axial length of the interface section is between 5-15% of the axial length of the body section.

The turbine engine component assembly of any preceding clause, wherein the diameter of the interface section is between 10-30% greater than the diameter of the body section.

The turbine engine component assembly of any preceding clause, wherein the diameter of the first contact surface of the first contact portion is between 10-30% greater than the diameter of the body section.

The turbine engine component assembly of any preceding clause, wherein the interface section includes a press fit interface configured to contact at least a portion of the second borehole.

The turbine engine component assembly of any preceding clause, wherein the diameter of the interface section is 2.54 to 12.7 micrometers greater than the diameter of the portion of the second borehole.

The turbine engine component assembly of any preceding clause, wherein the interface section includes a first threaded interface for coupling with a second threaded interface of the second borehole.

The turbine engine component assembly of any preceding clause, wherein the interface section is welded to a portion of the second borehole.

The turbine engine component assembly of any preceding clause, wherein the elongated portion includes a second interface section and wherein the interface section is positioned to interface the second borehole at a first location and the second interface section is positioned to interface the second borehole at a second location spaced apart from the first location.

The turbine engine component assembly of any preceding clause, wherein the interface section is chamfered at both ends.

What is claimed is:

1. A turbine engine component assembly comprising:

a first part comprising a ceramic matrix composite material and having a first flange defining a first borehole;

a second part defining a second borehole; and a pin inserted, in an axial direction, through the first borehole and the second borehole to connect the first part to the second part, the pin comprising:

a first contact portion positioned at a first axial location of the pin corresponding to the first borehole and, an elongated portion extending axially from the first contact portion;

wherein the first contact portion comprises a first chamfered section, a second chamfered section, and a first contact surface between the first chamfered section and the second chamfered section, wherein the first chamfered section and the second chamfered section slope away from the first contact surface with decreasing diameters.

2. The turbine engine component assembly of claim 1, wherein the first part comprises a shroud or a flowpath airfoil and the second part comprises a hanger on a turbine casing of the turbine engine component assembly.

3. The turbine engine component assembly of claim 1, wherein the second part is formed of a metal or metal alloy.

4. The turbine engine component assembly of claim 1, wherein slopes of the first chamfered section and the second chamfered section are each between 25-65 degrees.

5. The turbine engine component assembly of claim 1, wherein an axial length of the first chamfered section and the second chamfered section are each 10-40% of an axial length of the first contact surface.

6. The turbine engine component assembly of claim 1, wherein a first blend section is deposed between the first contact surface and the first chamfered section, the first blend section comprising a rounded edge that transitions from the first contact surface to the first chamfered section; and wherein a second blend section is deposed between the first contact surface and the second chamfered section, the second blend section comprising a rounded edge that transitions from the first contact surface to the second chamfered section.

7. The turbine engine component assembly of claim 1, wherein a diameter of the first contact surface of the first contact portion is 2-3% less than a diameter of the first borehole.

8. The turbine engine component assembly of claim 1, wherein an axial length of the first contact surface is between 40-90% of an axial length of the first borehole in the first flange.

9. The turbine engine component assembly of claim 1, wherein the first part further comprises:

a second flange defining a third borehole; and wherein the pin further comprises a second contact portion at a second axial location corresponding to the second borehole, the second contact portion including a second contact surface, a third chamfered section, and a fourth chamfered section.

10. The turbine engine component assembly of claim 1, further comprising:

a second pin having a second contact portion including a second contact surface, a third chamfered section, and a fourth chamfered section;

wherein the first part comprises a second flange defining a third borehole and the second part defines a fourth borehole; and wherein the second pin is inserted in the third borehole and the fourth borehole to connect the first part and the second part, and the second contact surface is positioned within the third borehole.

11. The turbine engine component assembly of claim 1, wherein the elongated portion includes a body section and an interface section, the body section having a diameter being smaller compared to a diameter of the interface section and a diameter of the first contact surface of the first contact portion.

12. The turbine engine component assembly of claim 11, wherein an axial length of the interface section is between 5-15% of an axial length of the body section.

13. The turbine engine component assembly of claim 11, wherein the diameter of the interface section is between 10-30% greater than the diameter of the body section.

14. The turbine engine component assembly of claim 11, wherein the diameter of the first contact surface of the first contact portion is between 10-30% greater than the diameter of the body section.

15. The turbine engine component assembly of claim 11, wherein the interface section comprises a press fit interface configured to contact at least a portion of the second borehole.

16. The turbine engine component assembly of claim 15, wherein the diameter of the interface section is 2.54 to 12.7 micrometers greater than a diameter of the portion of the second borehole.

17. The turbine engine component assembly of claim 15, wherein the interface section comprises a first threaded interface for coupling with a second threaded interface of the second borehole.

18. The turbine engine component assembly of claim 15, wherein the interface section is welded to a portion of the second borehole.

19. The turbine engine component assembly of claim 11, wherein the elongated portion includes a second interface section and wherein the interface section is positioned to interface the second borehole at a first location and the second interface section is positioned to interface the second borehole at a second location spaced apart from the first location.

20. The turbine engine component assembly of claim 11, wherein the interface section is chamfered at both ends.

* * * * *